(12) United States Patent
Nordbruch et al.

(10) Patent No.: US 10,490,073 B2
(45) Date of Patent: Nov. 26, 2019

(54) CONCEPT FOR LOCATING A BODY IN THE FORM OF AN OBJECT IN A PARKING LOT

(71) Applicant: Robert Bosch GmbH, Stuttgart (DE)

(72) Inventors: Stefan Nordbruch, Kornwestheim (DE); Thomas Nierhoff, Augsburg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/747,839

(22) PCT Filed: Jun. 16, 2016

(86) PCT No.: PCT/EP2016/063907
§ 371 (c)(1),
(2) Date: Jan. 26, 2018

(87) PCT Pub. No.: WO2017/021050
PCT Pub. Date: Feb. 9, 2017

(65) Prior Publication Data
US 2018/0211531 A1    Jul. 26, 2018

(30) Foreign Application Priority Data

Aug. 4, 2015   (DE) ..................... 10 2015 214 834

(51) Int. Cl.
*G08G 1/0967*     (2006.01)
*H04W 4/40*     (2018.01)
(Continued)

(52) U.S. Cl.
CPC ......... *G08G 1/09675* (2013.01); *G01C 21/30* (2013.01); *G01S 5/02* (2013.01);
(Continued)

(58) Field of Classification Search
None
See application file for complete search history.

(56) References Cited

U.S. PATENT DOCUMENTS 8,059,027 B2 * 11/2011 Khosravy ............... G01S 19/25
                                                                       342/357.25
8,447,463 B1 * 5/2013 Chowdhary et al. ...................
                                                                        G01M 17/00

(Continued)

FOREIGN PATENT DOCUMENTS

DE       102012222562 A1    6/2014

OTHER PUBLICATIONS

Boukerche, et al.: "Vehicular Ad Hoc Networks: A New Challenge for Localization-Based Systems", Computer Communications 31(12), (2008), pp. 1-12.

(Continued)

*Primary Examiner* — Thomas G Black
*Assistant Examiner* — Demetra R Smith-Stewart
(74) *Attorney, Agent, or Firm* — Norton Rose Fulbright US LLP; Gerard Messina

(57) ABSTRACT

A method for locating a body in the form of an object situated within a parking lot, the body including a communication interface for communicating via a wireless communication network, including the following steps: reception by the communication interface, via the wireless communication network, of position data of one or more vehicles traveling within the parking lot, the position data indicating a respective instantaneous position of the traveling vehicle or vehicles within the parking lot; location of the body within the parking lot based on the received position data. A corresponding device is also described. A method and a device for operating a vehicle traveling within a parking lot are also described. A body in the form of an object, a vehicle, and a computer program are also described.

19 Claims, 3 Drawing Sheets

(51) Int. Cl.
  *H04W 4/02* (2018.01)
  *G08G 1/133* (2006.01)
  *H04W 4/029* (2018.01)
  *G01S 5/02* (2010.01)
  *G01C 21/30* (2006.01)
  *H04W 4/04* (2009.01)

(52) U.S. Cl.
  CPC . *G08G 1/096708* (2013.01); *G08G 1/096716* (2013.01); *G08G 1/096791* (2013.01); *G08G 1/133* (2013.01); *H04W 4/029* (2018.02); *H04W 4/046* (2013.01); *H04W 4/40* (2018.02)

(56) References Cited

U.S. PATENT DOCUMENTS

| | | | |
|---|---|---|---|
| 9,602,193 B1* | 3/2017 | Mendelson | G08G 1/14 |
| 2003/0105583 A1 | 6/2003 | Aloi et al. | |
| 2005/0185046 A1 | 8/2005 | Chen et al. | |
| 2007/0178911 A1 | 8/2007 | Baumeister et al. | |
| 2007/0198160 A1 | 8/2007 | Sheynblat | |
| 2008/0299994 A1* | 12/2008 | Zhang | G01S 5/0257 455/456.6 |
| 2009/0043490 A1* | 2/2009 | Jung | G01C 21/20 701/533 |
| 2010/0085175 A1 | 4/2010 | Fridthjof | |
| 2010/0090893 A1* | 4/2010 | Hoshizaki | G01S 19/46 342/357.64 |
| 2010/0318293 A1* | 12/2010 | Brush | G01C 21/165 701/431 |
| 2011/0112766 A1* | 5/2011 | Haran | G01S 5/04 701/469 |
| 2013/0332060 A1* | 12/2013 | Chowdhary | G06Q 10/087 701/300 |
| 2014/0104051 A1* | 4/2014 | Breed | G06K 9/00791 340/435 |
| 2014/0213176 A1* | 7/2014 | Mendelson | G08G 1/14 455/39 |
| 2014/0309870 A1* | 10/2014 | Ricci et al. | G06F 21/00 |
| 2014/0349671 A1* | 11/2014 | Lakhzouri | G01S 5/0252 455/456.1 |
| 2015/0054639 A1* | 2/2015 | Rosen | G06K 9/00785 340/439 |
| 2015/0197248 A1* | 7/2015 | Breed | G08G 1/09626 701/93 |
| 2016/0202078 A1* | 7/2016 | Scalisi | G06F 16/9537 701/519 |
| 2017/0176601 A1* | 6/2017 | Nara | G01C 5/06 |

OTHER PUBLICATIONS

Krco, et al.: "P2P Mobile Sensor Networks", Proceedings of the 38th Hawaii Internaional Conference on System Sciences (2005), pp. 1-9.

Zhao, et al.: "IPARK: Location-Aware-Based Intelligent Parking Guidance over Infrastructureless VANETs", International Journal of Distributed Sensor Networks (2012), Article ID 280515, pp. 1-12.

International Search Report dated Oct. 4, 2016, of the corresponding International Application PCT/EP2016/063907 filed Jun. 16, 2016.

Parker, Ryan, Valaee, Shahrokh, Vehicle localization in vehicular networks. In: Vehicular Technology Conference, 2006. VTC-2006 Fall. 2006 IEEE 64th. IEEE, 2006 S.1-5.

\* cited by examiner

CONCEPT FOR LOCATING A BODY IN THE FORM OF AN OBJECT IN A PARKING LOT

FIELD

The present invention relates to a method and to a device for locating a body in the form of an object situated within a parking lot. The present invention also relates to a body in the form of an object. The present invention also relates to a method and a device for operating a vehicle traveling within a parking lot. The present invention also relates to a vehicle, and to a computer program.

BACKGROUND INFORMATION

German Patent Application No. DE 10 2012 222 562 A1 describes a system for commercially operated parking lots for guiding a vehicle from a start position to a destination position.

In fully automated (autonomous) so-called valet parking, a vehicle is parked by its driver at a drop zone, for example in front of a car park, and from there the vehicle drives itself to a parking position/parking bay, and back to the drop zone.

For so-called valet parking, it is important that the vehicle can be located as precisely as possible within the car park, or in general the parking lot.

In general, there is a need to be able to perform efficient location within a parking lot, for example when a user is going to his vehicle that is parked on a parking surface of the parking lot.

SUMMARY

An object of the present invention is to provide an efficient design based on which a body in the form of an object situated within a parking lot can be efficiently located.

Advantageous embodiments of the present invention are described herein.

According to an aspect of the present invention, an example method is provided for locating a body in the form of an object situated within a parking lot, the body including a communication interface for communicating via a wireless communication network, including the following steps:
 reception by the communication interface, via the wireless communication network, of position data of one or more vehicles traveling within the parking lot, the position data indicating a respective instantaneous position of the one or more vehicles traveling within the parking lot,
 locating the body within the parking lot based on the received position data.

According to another aspect of the present invention, a device is provided for locating a body in the form of an object situated within a parking lot, including:
 a communication interface for communicating via a wireless communication network,
 the communication interface being fashioned to receive position data from one or more vehicles traveling within the parking lot via the wireless communication network, the position data indicating a respective position of the traveling vehicle or vehicles, and
 a locating device for locating the body within the parking lot based on the received position data.

According to another aspect of the present invention, a body in the form of an object is provided that includes the device for locating a body in the form of an object situated within a parking lot.

According to a specific embodiment of the present invention, the body is a vehicle, in particular a motor vehicle, or an end device, in particular a mobile end device, for example a mobile telephone.

According to a further aspect of the present invention, a method is provided for operating a vehicle traveling within a parking lot in order to enable location of a body in the form of an object situated within the parking lot, including:
 determining a position of the vehicle traveling within the parking lot,
 ascertaining position data that indicate the determined position of the traveling vehicle within the parking lot, and
 sending the ascertained position data from the traveling vehicle via a wireless communication network, so that the body can be located within the parking lot based on the position data.

According to another aspect of the present invention, a device is provided for operating a vehicle traveling within a parking lot in order to enable location of a body in the form of an object situated within the parking lot, including:
 a determining device for determining an instantaneous position of the vehicle while the vehicle is traveling within a parking lot, and for ascertaining position data that indicate the determined position of the traveling vehicle within the parking lot, and
 a communication interface for sending the position data while the vehicle is traveling, via a wireless communication network, so that the body can be located within the parking lot based on the position data.

According to a further aspect of the present invention, a vehicle is provided that includes the device for operating a vehicle traveling within a parking lot and/or the device for locating a body in the form of an object situated within a parking lot.

According to another aspect of the present invention, a computer program is provided that includes program code for carrying out the method for locating a body in the form of an object situated within a parking lot and/or for carrying out the method for operating a vehicle traveling within a parking lot when the computer program is executed on a computer.

The present invention thus includes that vehicles traveling within the parking lot send or communicate their respective instantaneous position via a wireless communication network. The body, which includes a communication interface for receiving this sent position data via the wireless communication network, receives these position data and ascertains or determines its own position within the parking lot based on the position data of the traveling vehicles. Thus, a location design is provided on the basis of the sending of position data of vehicles traveling or moving within the parking lot whose position within the parking lot is known. The traveling vehicles thus ascertain their instantaneous position while traveling within the parking lot, and send this position via the communication network to the vehicle that wants to locate itself within the parking lot.

That is, one or more traveling, i.e., moving, vehicles determine their respective position within the parking lot and ascertain position data corresponding to this determined position, and subsequently send position data via a communication network, in particular to the vehicle that is to be located. The moving vehicles thus send their known positions, so that a vehicle to be located can also locate itself within the parking lot based on the known positions. Traveling vehicles have a speed greater than 0 m/s.

In this way, in particular the technical advantage is brought about that the body can be located within the parking lot more efficiently. In particular, this also functions at locations at which reception of satellite signals is not possible, or is possible only with interference. Such satellite signals include for example GPS (Global Positioning System) signals. A location of a body based on GPS signals for example will function only to a limited extent, up to not at all, within a basement or a parking garage, should the parking lot include a basement or be fashioned as a parking garage.

In addition, in particular the technical advantage is brought about that the traveling vehicles can be used efficiently. This is because they are used to locate a body situated within the parking lot. That is, the traveling vehicles advantageously fulfill the purpose or the task of helping a body in the form of an object situated within the parking lot locate itself.

In the sense of the present invention, a parking lot is a parking surface for vehicles. The parking lot thus forms in particular a contiguous surface that has a plurality of parking spaces, whether on private or public ground. The parking spaces are thus the parking surfaces. According to a specific embodiment, the parking lot is fashioned as a car park. According to another specific embodiment, the parking lot is fashioned as a garage, also called a parking garage.

In the sense of the present invention, according to a specific embodiment vehicles include vehicles that carry out an automatic parking process within the parking lot. Such an automatic parking process can be designated an AVP process. "AVP" stands for "Automated Valet Parking."

According to a specific embodiment, an automatic parking process of a vehicle includes the feature that the vehicle is remotely controlled. According to a specific embodiment, it is provided that an automatic parking process of the vehicle includes the feature that the vehicle travels at least partly autonomously, in particular completely autonomously. According to a specific embodiment, mixed forms of the two specific embodiments named above are provided. That is, for example the vehicle can travel autonomously along part of a route. Another partial route is then traveled by the vehicle under remote control.

In the sense of the present invention, "autonomous" means in particular that the vehicle navigates or drives on the parking lot by itself, i.e., without intervention by a driver. The vehicle thus drives by itself on the parking lot without a driver having to control the vehicle for this purpose. Controlling or guiding includes in particular transverse and/or longitudinal guiding.

A vehicle that can be guided autonomously and/or in remotely controlled fashion, i.e., in general without a driver, within or on a parking lot, is for example designated an AVP vehicle. AVP, or automated valet parking, can be understood as an automatic parking process.

According to a specific embodiment, at least some of, and in particular all, the moving vehicles are AVP vehicles.

The vehicle to be located is for example an AVP vehicle.

According to a specific embodiment of the present invention, the wireless communication network includes a WLAN network and/or a mobile radiotelephone network.

In a specific embodiment of the present invention, the communication network includes a communication network according to the LoRa standard. "LoRa" stands for "low-power wide-range communication." Thus, according to a specific embodiment, the communication network includes a LoRa communication network.

According to a specific embodiment of the present invention, the communication network includes a C2C communication network. Here, C2C stands for "car to car," and designates a communication between a vehicle and another vehicle.

In another specific embodiment of the present invention, a communication over the communication network is encrypted.

Vehicles in the sense of the present invention are for example motor vehicles, in particular passenger vehicles and/or trucks, and/or two-wheeled motor vehicles, such as motorcycles.

According to a specific embodiment, position data include the following position indications: x, y, z values of a Cartesian coordinate system. In this way, a determination of the position within the Cartesian coordinate system is advantageously enabled.

According to a specific embodiment of the present invention, position data include the following position indications: geographical coordinates of a geographical coordinate system. Geographical coordinates are geographical width and geographical length. In this way, a determination of the position within the geographical coordinate system is advantageously enabled.

According to a specific embodiment of the present invention, it is provided that the position data indicate in which level of the parking lot the corresponding traveling vehicle is situated, the location in addition including:
ascertaining the level of the parking lot in which the body is situated, based on the indicated level.

In this way, in particular the technical advantage is brought about that it can be efficiently ascertained in which level of the parking lot the body is situated.

According to a further specific embodiment of the present invention, it is provided that the position data are included in position signals sent out by the traveling vehicles, which signals are received by the communication interface.

In this way, in particular the technical advantage is brought about that the position data can efficiently be transmitted via the communication network.

According to another specific embodiment of the present invention, it is provided that the intensity of each of one or more received position signals is measured, the body being located within the parking lot based on the measured signal intensity or intensities.

In this way, in particular the technical advantage is brought about that the location can be carried out efficiently. For example, a triangulation can be carried out in order to locate the body within the parking lot.

According to another specific embodiment of the present invention, it is provided that at least some of the position signals each include a transmit date that indicates a respective time of transmission of the corresponding position signal, a respective receive date of the corresponding position signals being ascertained that indicates a receive time of the corresponding position signal, and, based on the transmit date and the receive date, a runtime of the corresponding position signal from the corresponding traveling vehicle to the body is ascertained, the body being located within the parking lot based on the ascertained runtime.

In this way, in particular the technical advantage is brought about that an efficient runtime measurement can be carried out, so that the body can be efficiently located within the parking lot based on this runtime measurement.

According to a further specific embodiment of the present invention, it is provided that the body is an element selected from the following group of bodies: a vehicle, in particular a motor vehicle; an end device, in particular a mobile end device, in particular a mobile telephone. The vehicle is for example an AVP vehicle.

Thus, the location of a motor vehicle within the parking lot is advantageously enabled. In particular if the body is an end device, for example a mobile end device, in particular a mobile telephone, then a user or a person can efficiently locate itself within the parking lot using the end device.

According to a specific embodiment of the present invention, it is provided that the device for locating a body situated within a parking lot is fashioned to carry out the method for locating a body situated within a parking lot.

Technical functionalities and features of the device for locating a body situated within a parking lot result analogously from corresponding technical functionalities and features of the method for locating a body in the form of an object situated within a parking lot, and vice versa.

According to another specific embodiment of the present invention, it is provided that the device for operating a vehicle traveling within a parking lot is fashioned to carry out the method for operating a vehicle traveling within a parking lot.

Technical functionalities and features of the device for operating a vehicle traveling within a parking lot result analogously from corresponding technical functionalities and features of the method for operating a vehicle traveling within a parking lot, and vice versa.

According to a specific embodiment of the present invention, it is provided that the position data indicate in which level of the parking lot the corresponding traveling vehicle is situated, the location device being fashioned to ascertain, based on the indicated level, in which level of the parking lot the body is situated.

According to another specific embodiment of the present invention, it is provided that the position data are included in position signals sent out by the traveling vehicles, the communication interface being fashioned to receive the position signals.

According to another specific embodiment of the present invention, it is provided that the location device is fashioned to measure a respective intensity of one or more received position signals, the location device being fashioned to locate the body within the parking lot based on the measured signal intensity or intensities.

According to another specific embodiment of the present invention, it is provided that at least some of the position signals each include a transmit date that indicates a respective transmit time of the corresponding position signal, the location device being fashioned to ascertain a respective receive date of the corresponding position signals, the receive date indicating a receive time of the corresponding position signal, the location device being fashioned to ascertain, based on the transmit date and the receive date, a runtime of the corresponding position signal from the corresponding traveling vehicle to the body, the location device being fashioned to locate the body within the parking lot based on the ascertained runtime.

According to a further specific embodiment of the present invention, it is provided that the position data include at least one of the following position indications:
level of the parking lot in which the traveling vehicle is situated,
x, y, z values of a Cartesian coordinate system,
geographical coordinates of a geographical coordinate system.

According to another specific embodiment of the present invention, it is provided that the determination of the position of the traveling vehicle includes the following:
reception of position data of one or more further vehicles traveling within the parking lot via the wireless communication network, the position data indicating a respective instantaneous position of the further vehicle or vehicles traveling within the parking lot,
location of the vehicle within the parking lot based on the received position data in order to determine the position of the traveling vehicle, so that the position of the traveling vehicle is determined based on the location.

In this way, in particular the technical advantage is brought about that the traveling vehicle can be efficiently located. The traveling vehicle is thus advantageously located in the same manner as the body. The traveling vehicle is thus located based on the received position data. Based on the location, the position of the traveling vehicle within the parking lot is determined.

Alternatively or in addition, the traveling vehicle can also use further location methods or location techniques in order to be located within the parking lot, i.e., to determine its instantaneous position within the parking lot.

According to a specific embodiment of the present invention, it is provided that the vehicle is guided in driverless fashion based on the location within the parking lot. Such driverless guidance of the vehicle within the parking lot includes for example the feature that the vehicle travels autonomously. In particular, such driverless guidance of the vehicle includes the feature that the vehicle is remotely controlled within the parking lot.

According to a specific embodiment of the present invention, it is provided that the vehicle is fashioned or set up to carry out the method for operating a vehicle traveling within a parking lot.

According to a specific embodiment of the present invention, it is provided that the vehicle is located within the parking lot based on the method for locating a body in the form of an object situated within a parking lot.

According to a specific embodiment of the present invention, the vehicle is an AVP vehicle.

According to a specific embodiment of the present invention, the vehicle carries out an automatic parking process.

The location includes the feature that the vehicle is located in a digital map of the parking lot. That is, the location includes the feature that a position of the body in the digital map is determined.

Below, the present invention is explained in more detail on the basis of preferred exemplary embodiments.

DETAILED DESCRIPTION OF EXAMPLE EMBODIMENTS

Figure 1:
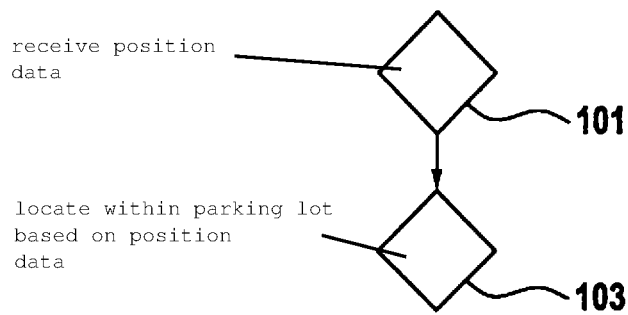
FIG. 1 shows a flow diagram of a method for locating a body in the form of an object situated within a parking lot.

FIG. 1 shows a flow diagram of a method for locating a body in the form of an object situated within a parking lot, the body including a communication interface for communicating via a wireless communication network.

The method includes the following steps:
- reception 101 by the communication interface, via the wireless communication network, of position data of one or more vehicles traveling within the parking lot, the position data indicating a respective instantaneous position of the one or more vehicles traveling within the parking lot,
- location 103 of the body within the parking lot based on the received position data.

Figure 2:
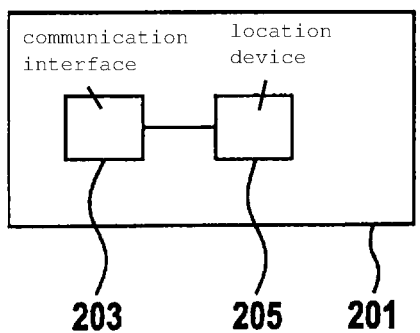
FIG. 2 shows a device for locating a body in the form of an object situated within a parking lot.

FIG. 2 shows a device 201 for locating a body in the form of an object situated within a parking lot.

Device 201 includes:
- a communication interface 203 for communicating via a wireless communication network,
- the communication interface being fashioned to receive position data from one or more vehicles traveling within the parking lot via the wireless communication network, the position data indicating a respective position of the traveling vehicle or vehicles, and
- a location device 205 for locating the body within the parking lot based on the received position data.

Figure 3:
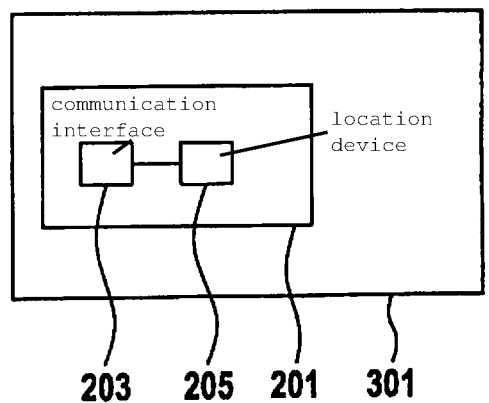
FIG. 3 shows a body in the form of an object.

FIG. 3 shows a body 301 in the form of an object.

Body 301 in the form of an object includes device 201 of FIG. 2.

Body 301 is for example a vehicle, in particular a motor vehicle.

Body 301 is for example an end device, in particular a mobile end device, in particular a mobile telephone.

Figure 4:
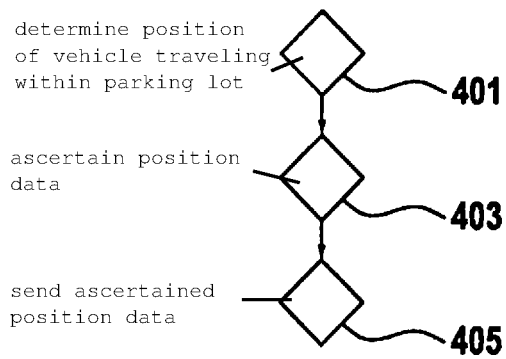
FIG. 4 shows a method for operating a vehicle traveling within a parking lot.

FIG. 4 shows a flow diagram of a method for operating a vehicle traveling within a parking lot in order to enable location of a body in the form of an object situated within the parking lot.

The method includes the following steps:
- determination 401 of a position of the vehicle traveling within the parking lot,
- ascertaining 403 of position data that indicate the determined position of the traveling vehicle within the parking lot, and
- sending 405 of the ascertained position data from the traveling vehicle via a wireless communication network, so that the body can be located within the parking lot based on the position data.

According to a specific embodiment, it is provided that the vehicle traveling within the parking lot itself receives position data from one or more further vehicles traveling within the parking lot via the wireless communication network, these position data indicating a respective instantaneous position of the further vehicle or vehicles traveling within the parking lot. The traveling vehicle is then located within the parking lot based on these received position data in order to determine its own position within the parking lot based thereon.

Thus, according to a specific embodiment it is provided that the vehicle traveling within the parking lot includes device 201 of FIG. 2.

Figure 5:
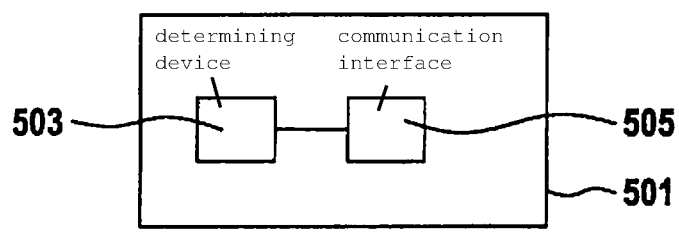
FIG. 5 shows a device for operating a vehicle traveling within a parking lot.

FIG. 5 shows a device 501 for operating a vehicle traveling within a parking lot in order to enable location of a body in the form of an object situated within the parking lot.

Device 501 includes:
- a determining device 503 for determining an instantaneous position of the vehicle while the vehicle is traveling within a parking lot and for ascertaining position data that indicate the determined position of the traveling vehicle within the parking lot, and
- a communication interface 505 for sending the position data while the vehicle is traveling, via a wireless communication network, so that the body can be located within the parking lot based on the position data.

According to a specific embodiment, it is provided that communication interface 505 is fashioned to receive position data from one or more further vehicles traveling within the parking lot via the wireless communication network, the position data indicating a respective instantaneous position of the further vehicle or vehicles traveling within the parking lot. Thus, according to a specific embodiment determining device 503 is fashioned to locate the vehicle within the parking lot based on the received position data in order to determine the position of the traveling vehicle.

Figure 6:
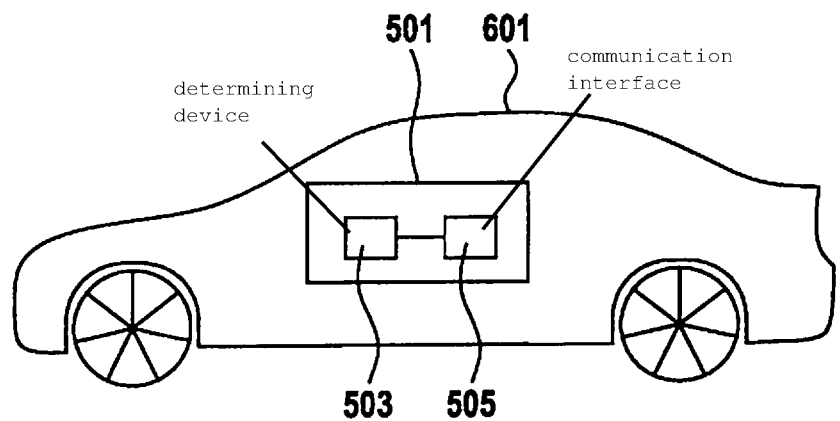
FIG. 6 shows a vehicle.

FIG. 6 shows a vehicle 601.

Vehicle 601 includes device 501 of FIG. 5.

Vehicle 601 is for example a motor vehicle.

Vehicle 601 can include device 201 of FIG. 2, instead of or in addition to device 501 of FIG. 5.

Figure 7:
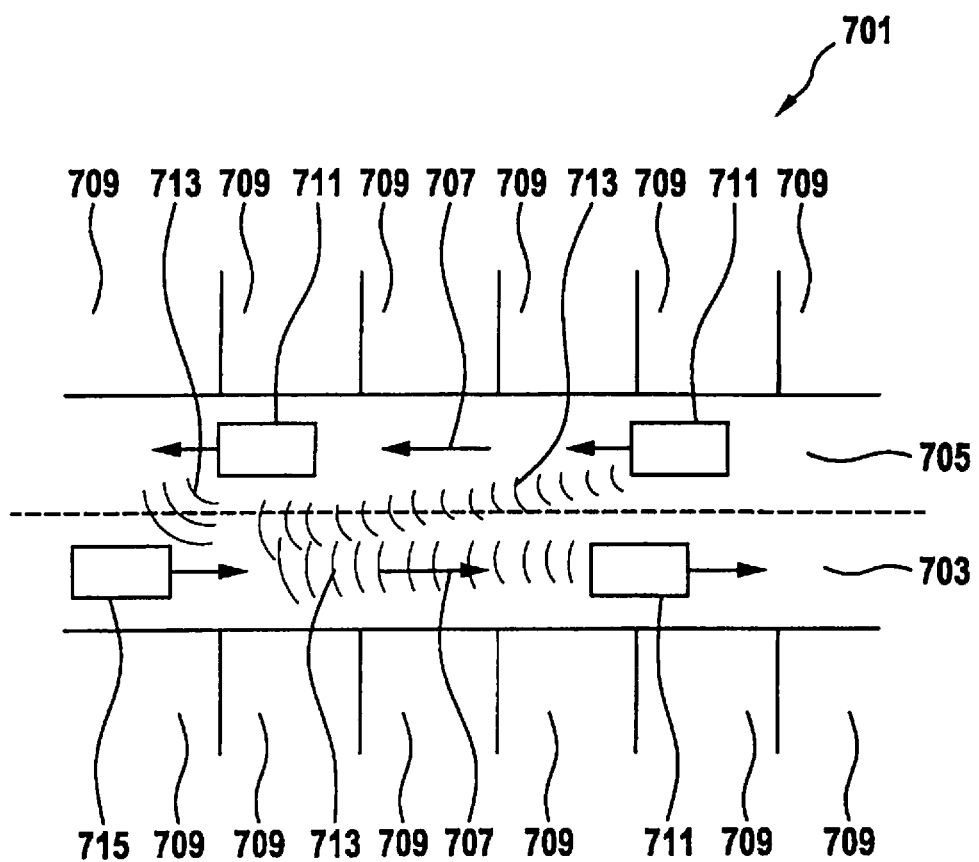
FIG. 7 shows a parking lot.

FIG. 7 shows a parking lot 701.

Parking lot 701 includes two driving lanes 703, 705 that specify directions of travel opposite one another, shown symbolically by two arrows having reference character 707.

Transverse to driving lanes 703, 705, parking positions 709 are provided at which vehicles can park.

A plurality of vehicles 711 are traveling on driving lanes 703, 705. That is, a plurality of vehicles 711 are moving within parking lot 701.

A vehicle 715 that includes device 201 according to FIG. 2, but is not shown in FIG. 7 for clarity, is traveling on driving lanes 703, and now wishes to locate itself within parking lot 701. The location includes for example the following:

Vehicles 711 send their instantaneous position via a wireless communication network. The sending via the wireless communication network is identified or shown symbolically by graphic elements having reference character 713.

That is, vehicle 715 is provided with the instantaneous positions of traveling vehicles 711 in order to locate itself within parking lot 701. For example, vehicle 715 carries out a triangulation based on received position signals. In particular, vehicle 715 carries out a runtime measurement of the position signals. That is, the known positions of vehicles 711 are used to locate vehicle 715 within parking lot 701.

That is, vehicles 711 first themselves ascertain or determine their instantaneous position. Subsequently, the additional vehicles 711 send their determined instantaneous position to vehicle 715 via the wireless communication network.

In sum, the present invention provides a technical design by which in particular a degree of precision of location can be improved. This is the case in particular if vehicle 715 is in addition using further location methods to enable it to locate itself within parking lot 701.

In accordance with the present invention, not only infrastructure that may be present (for example cameras in the parking garage) is used, and, if warranted, information about the home vehicle during travel in order to determine the position of the vehicle within the parking lot, but also information is used from other vehicles moving within the parking lot.

According to a specific embodiment, the other vehicles ascertain their own instantaneous position using the same methods as vehicle 715, and/or are sent this instantaneous position. However, these other vehicles can also use other and/or additional methods for location.

An advantage of the present invention is in particular that from "imprecise" positions of a plurality of vehicles a "more precise" position can be ascertained. That is, on the basis of a multiplicity of positions of a large number of vehicles, a physician for the home vehicle can be ascertained, the precision of the position for the home vehicle being greater than a degree of precision of an individual position of a traveling vehicle.

The design according to the present invention can replace known location methods, or can be used in addition to these known methods.

The advantages according to the present invention of the design are in particular an increased degree of robustness of a location system based on the location design according to the present invention. In particular, an advantage is also a low probability of failure of such a location system. In particular, an advantage is also an increased degree of precision of the location system. In particular, the advantage is also that fewer errors (for example location and/or tracking errors) can occur during the movement of the vehicle.

What is claimed is:

1. A method for locating a body in the form of an object situated within a parking lot, the body including a communication interface for communicating via a wireless communication network, the method comprising:
   receiving, by the communication interface of the body via the wireless communication network, position data of one or more vehicles traveling within the parking lot, the position data indicating a respective instantaneous position of the one or more traveling vehicles within the parking lot; and
   locating, by the body, itself within the parking lot based on the received position data;
   wherein the one or more traveling vehicles are separate from the body.

2. The method as recited in claim 1, wherein the position data includes position signals transmitted via the wireless communication network by the one or more traveling vehicles, which signals are received by the communication interface.

3. The method as recited in claim 2, wherein a respective intensity of one or more received position signals being measured, the body being located within the parking lot based on the measured signal intensities.

4. The method as recited in claim 1, wherein the body is an element selected from the following group of bodies: a motor vehicle and a mobile telephone.

5. The method as recited in claim 1, wherein the position data includes at least one of the following position indications: x, y, z values of a Cartesian coordinate system, and geographical coordinates of a geographical coordinate system.

6. The method as recited in claim 1, wherein the locating of the body within the parking lot based on the received position data includes performing a triangulation based on the received position data, the body being located within the parking lot based on the triangulation.

7. A method for locating a body in the form of an object situated within a parking lot, the body including a communication interface for communicating via a wireless communication network, the method comprising:
   receiving, by the communication interface of the body via the wireless communication network, position data of one or more vehicles traveling within the parking lot, the position data indicating a respective instantaneous position of the one or more traveling vehicles within the parking lot; and
   locating, by the body, itself within the parking lot based on the received position data;
   wherein the position data indicates in which level of the parking lot the corresponding traveling vehicle is situated, and the step of locating further includes ascertaining the level of the parking lot in which the body is situated, based on the indicated level;
   wherein the one or more traveling vehicles are separate from the body.

8. The method as recited in claim 7, wherein the locating of the body within the parking lot based on the received position data includes performing a triangulation based on the received position data, the body being located within the parking lot based on the triangulation.

9. A method for locating a body in the form of an object situated within a parking lot, the body including a communication interface for communicating via a wireless communication network, the method comprising:
   receiving, by the communication interface via the wireless communication network, position data of one or more vehicles traveling within the parking lot, the position data indicating a respective instantaneous position of the one or more traveling vehicles within the parking lot; and
   locating the body within the parking lot based on the received position data;
   wherein the position data includes position signals sent out by the traveling vehicles, which signals are received by the communication interface,
   wherein each of at least some of the position signals including a transmit date that indicates a respective transmit time of the corresponding position signal, a respective receive date of the corresponding position signals being ascertained that indicates a receive time of the corresponding position signal, a runtime of the corresponding position signal from the corresponding traveling vehicle to the body being ascertained based on the transmit date and the receive date, the body being located within the parking lot based on the ascertained runtime.

10. A device for locating a body in the form of an object situated within a parking lot, comprising:
   a communication interface of the body for communicating via a wireless communication network, the communication interface being fashioned to receive position data from one or more vehicles traveling within the parking lot via the wireless communication network, the position data indicating a respective position of the traveling one or more traveling vehicles; and
   a location device of the body for locating, by the body, itself within the parking lot based on the received position data;
   wherein the one or more traveling vehicles are separate from the body.

11. The device as recited in claim 10, wherein the location device is configured to perform a triangulation based on the received position data, the location device locating the body within the parking lot based on the triangulation.

12. A body in the form of an object, the body comprising:
   a device for locating a body in the form of an object situated within a parking lot, the device including a communication interface of the body for communicating via a wireless communication network, the communication interface being fashioned to receive position data from one or more vehicles traveling within the parking lot via the wireless communication network, the position data indicating a respective position of the one or more traveling vehicles, and a location device of the body for locating, by the body, itself within the parking lot based on the received position data;

wherein the body is one of a motor vehicle or a mobile telephone, wherein the one or more traveling vehicles within the parking lot are separate from the body.

13. The body as recited in claim 12, wherein the location device is configured to perform a triangulation based on the received position data, the location device locating the body within the parking lot based on the triangulation.

14. A method for operating a vehicle traveling within a parking lot to enable location of a body in the form of an object situated within the parking lot, comprising:

determining, by the traveling vehicle, a position of the vehicle traveling within the parking lot;

ascertaining, by the traveling vehicle, position data that indicate the determined position of the traveling vehicle within the parking lot; and transmitting the ascertained position data from the traveling vehicle via a wireless communication network, so that the body can be located within the parking lot based on the position data;

wherein the determining of the position includes:

receiving, by the traveling vehicle, position data from one or more further vehicles traveling within the parking lot, via the wireless communication network, the position data indicating a respective instantaneous position of the one or more further vehicles traveling within the parking lot; and locating, by the traveling vehicle, itself within the parking lot based on the received position data in order to determine the position of the traveling vehicle;

wherein the one or more further vehicles are separate from the traveling vehicle.

15. The method as recited in claim 14, wherein the locating of the vehicle within the parking lot based on the received position data in order to determine the position of the traveling vehicle includes performing a triangulation based on the received position data, the position of the traveling vehicle being determined based on the triangulation.

16. A vehicle, comprising:

a device for locating the vehicle situated within a parking lot, the device including a communication interface of the vehicle for communicating via a wireless communication network, the communication interface being fashioned to receive position data from one or more vehicles traveling within the parking lot via the wireless communication network, the position data indicating a respective position of the one or more traveling vehicles, and a location device of the vehicle for locating itself within the parking lot based on the received position data;

wherein the one of more traveling vehicles are separate from the vehicle.

17. The vehicle as recited in claim 16, wherein the location device is configured to perform a triangulation based on the received position data, the location device locating the vehicle within the parking lot based on the triangulation.

18. A non-transitory computer-readable storage medium on which is stored a computer program including program code for locating a body in the form of an object situated within a parking lot, the body including a communication interface for communicating via a wireless communication network, the computer program, when executed by a processor, causing the processor to perform:

receiving, by the communication interface of the body via the wireless communication network, position data of one or more vehicles traveling within the parking lot, the position data indicating a respective instantaneous position of the one or more traveling vehicles within the parking lot; and locating, by the body, itself within the parking lot based on the received position data;

wherein the one or more traveling vehicles are separate from the body.

19. The non-transitory computer-readable storage medium as recited in claim 18, wherein the locating of the body within the parking lot based on the received position data includes performing a triangulation based on the received position data, the body being located within the parking lot based on the triangulation.

* * * * *